United States Patent

Iikawa et al.

[11] Patent Number: 6,118,601
[45] Date of Patent: Sep. 12, 2000

[54] FLOATING LENS BARREL, LENS BARREL, AND A COMMON LENS BARREL SYSTEM

[75] Inventors: Makoto Iikawa; Takuji Hamasaki, both of Saitama, Japan

[73] Assignee: Asahi Kogaku Kogyo Kabushiki Kaisha, Tokyo, Japan

[21] Appl. No.: 09/176,960

[22] Filed: Oct. 22, 1998

[30] Foreign Application Priority Data

Oct. 24, 1997 [JP] Japan ................................ 9-292704

[51] Int. Cl.$^7$ ...................................................... G02B 7/02
[52] U.S. Cl. .......................... 359/823; 354/700; 354/699
[58] Field of Search .................................. 359/699, 694, 359/700, 701, 823, 703, 704

[56] References Cited

U.S. PATENT DOCUMENTS

| | | | |
|---|---|---|---|
| 3,772,978 | 11/1973 | Mito | 95/45 |
| 3,895,858 | 7/1975 | Sawano | 350/255 |
| 4,309,076 | 1/1982 | Ito | 350/255 |
| 4,458,990 | 7/1984 | Kawai | 350/429 |
| 4,472,039 | 9/1984 | Iwata et al. | 354/271.1 |
| 4,564,264 | 1/1986 | Komoto . | |
| 5,018,843 | 5/1991 | Inadome et al. | 350/429 |
| 5,956,189 | 9/1999 | Azegami et al. | 359/823 |

Primary Examiner—Georgia Epps
Assistant Examiner—Tim Thompson
Attorney, Agent, or Firm—Greenblum & Bernstein P.L.C.

[57] ABSTRACT

A floating lens barrel includes a stationary barrel which can be connected to a camera body, a rotation ring which is rotatably supported by the stationary barrel and which is rotated in accordance with the focusing operation, a female helicoid ring provided on the stationary barrel, a front lens support ring which supports a focusing front lens group and which is guided to move linearly in the optical axis direction, a male helicoid ring which is supported by the front lens support ring so as to rotate relative thereto but not to move in the optical axis direction relative to the front lens support ring, a combination of rotation transmission grooves and pins for transmitting the rotation of the rotation ring to the male helicoid ring, and a rear lens support ring which holds a focusing rear lens group and which is guided to move linearly in the optical axis direction by the front lens support ring, in accordance with a cam groove formed in the male helicoid ring. A non-floating lens barrel and a common lens barrel system are also disclosed.

9 Claims, 4 Drawing Sheets

FLOATING LENS BARREL, LENS BARREL, AND A COMMON LENS BARREL SYSTEM

BACKGROUND OF THE INVENTION

1. Field of the Invention

The present invention relates to a floating lens barrel, a lens barrel, and a lens barrel system for common se.

2. Description of the Related Art

In a known floating lens system, especially for spherical aberration correction, a focusing lens group is split into a front lens group and a rear lens group, so that a slight relative movement of the front lens group and the rear lens group occurs upon focusing in accordance with the object distance. Hitherto, it has been necessary for a lens barrel for the floating lens system to be provided with a plurality of concentric helicoids whose center is located on the optical axis, so that the relative movement takes place between the front and rear lens groups in accordance with the rotation of a distance adjusting ring which is driven by the power for the focusing operation. However, a lens barrel using a plurality of helicoids has many drawbacks: the drive torque is increased, a deviation tends to occur between the axes of the front and rear lens groups, the distance between the front and rear lens groups tends to change during the assembly, it is difficult to adjust the distance between the front and rear lens groups, and it is difficult to adjust the flange back (FB).

SUMMARY OF THE INVENTION

It is an object of the present invention to eliminate the above-mentioned drawbacks of the floating lens barrel.

Another object of the present invention is to provide a lens barrel having no floating function, which can be easily assembled.

Yet another object of the present invention is to provide a common lens barrel system, a part of which can be used commonly as a pair of floating lens barrels or a floating lens barrel and a non-floating lens barrel.

According to an aspect of the present invention, there is provided a floating lens barrel having a focusing front lens group and a focusing rear lens group which includes: a stationary barrel to be connected to a camera body; a rotation ring which is rotatable relative to the stationary barrel and which is rotated in accordance with focusing operation of the camera; a female helicoid ring provided on the stationary barrel; a front lens support ring which supports the focusing front lens group and which is guided to move linearly in the optical axis direction; a male helicoid ring which is supported by the front lens support ring so as to rotate relative thereto but not to move in the optical axis direction relative to the front lens support ring, the male helicoid ring being provided with a cam groove; a rotation transmission mechanism for transmitting the rotation of the rotation ring to the male helicoid ring; and a rear lens support ring which holds the focusing rear lens group and which is guided to move linearly in the optical axis direction by the front lens support ring, the rear lens support ring being moved relative to the front lens support ring in the optical axis direction in accordance with the cam groove of the male helicoid ring when the male helicoid ring is rotated.

Preferably, the rotation transmission mechanism includes a rotation transmission groove which extends in parallel with the optical axis and which is formed on one of either the rotation ring or the male helicoid ring, and a rotation transmission pin which is provided on the other of the either the male helicoid ring or the rotation ring, the rotation transmission pin being inserted into the rotation transmission groove.

Preferably, the female helicoid ring is made separate from the stationary barrel and wherein the relative angular position therebetween is adjustable.

Preferably, the female helicoid ring is detachably attached to the stationary barrel, so that when the female helicoid ring is detached from the stationary barrel, the front lens support ring, the male helicoid ring, and the rear lens support ring are detached together from the stationary barrel and the rotation ring.

Preferably, the rotation ring is rotated in accordance with the rotation of a distance adjusting ring which is manually rotated or driven by an AF drive shaft.

Preferably, the front lens support ring is guided in a linear movement guide groove which is formed in the stationary barrel and which extends in parallel with the optical axis.

Preferably, a spacer washer is provided between a flange of the front lens support ring and a flange of the front lens support frame which is supported by the front lens support ring to adjust the relative position between the front lens support ring and the front lens support frame in the optical axis direction.

According to another aspect of the present invention there is provided a lens barrel which includes: a stationary barrel to be connected to a camera body; a rotation ring which is rotatably supported by the stationary barrel and which is rotated in accordance with a focusing operation; a female helicoid ring provided on the stationary barrel; a lens support ring which supports a focusing lens and which is guided to move linearly in the optical axis direction; a male helicoid ring which is supported by the lens support ring so as to rotate relative thereto but not to move in the optical axis direction relative to the front lens support ring; and a rotation transmission mechanism for transmitting the rotation of the rotation ring to the male helicoid ring.

According to another aspect of the present invention there is provided a common lens barrel system which includes: a common lens barrel which constitutes a stationary barrel which can is connected to a camera body, and a rotation ring which is rotatably supported by the stationary barrel and which is rotated in accordance with a focusing operation of the camera; a first separate lens barrel which constitutes a female helicoid ring which can be detachably attached to the stationary barrel from the front thereof, a front lens support ring which supports a focusing front lens group and which can be inserted in the stationary barrel, the front lens support ring being guided to move linearly in the optical axis direction, a male helicoid ring which is supported by the front lens support ring so as to rotate relative thereto but not to move in the optical axis direction relative to the front lens support ring, the male helicoid ring being engaged by the female helicoid ring, a rotation transmission groove provided on one of the rotation ring and the male helicoid ring and a rotation transmission pin provided on the other of the male helicoid ring and the rotation ring, the rotation transmission pin being fitted in the rotation transmission groove, and a rear lens support ring which holds a focusing rear lens group and which is guided to move linearly in the optical axis direction by the front lens support ring, the rear lens support ring being moved relative to the front lens support ring in the optical axis direction in accordance with a cam groove formed in the male helicoid ring; and a second separate lens barrel which comprises a female helicoid ring which can be detachably attached to the stationary barrel from the front thereof, a lens support ring which supports a focusing lens group and which can be inserted in the stationary barrel, the front lens support ring being guided to move linearly in the optical axis direction, a male helicoid ring which is supported by the lens support ring so as to rotate relative thereto but not to move in the optical axis direction relative to the lens support ring, the male helicoid ring being engaged by the female helicoid ring, and a rotation transmission groove provided on one rotation ring and the male helicoid ring and a rotation transmission pin provided on the other male helicoid ring or the rotation ring, the rotation transmission pin being fitted in the rotation transmission groove; wherein the first separate lens barrel and the second separate lens barrel is selectively attached the common lens barrel.

Preferably, the relative angular position of the female helicoid rings of the first and second separate lens barrels and the stationary barrel is adjustable.

The present disclosure relates to subject matter contained in Japanese Patent Application No. 09-292704 (filed Oct. 24, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
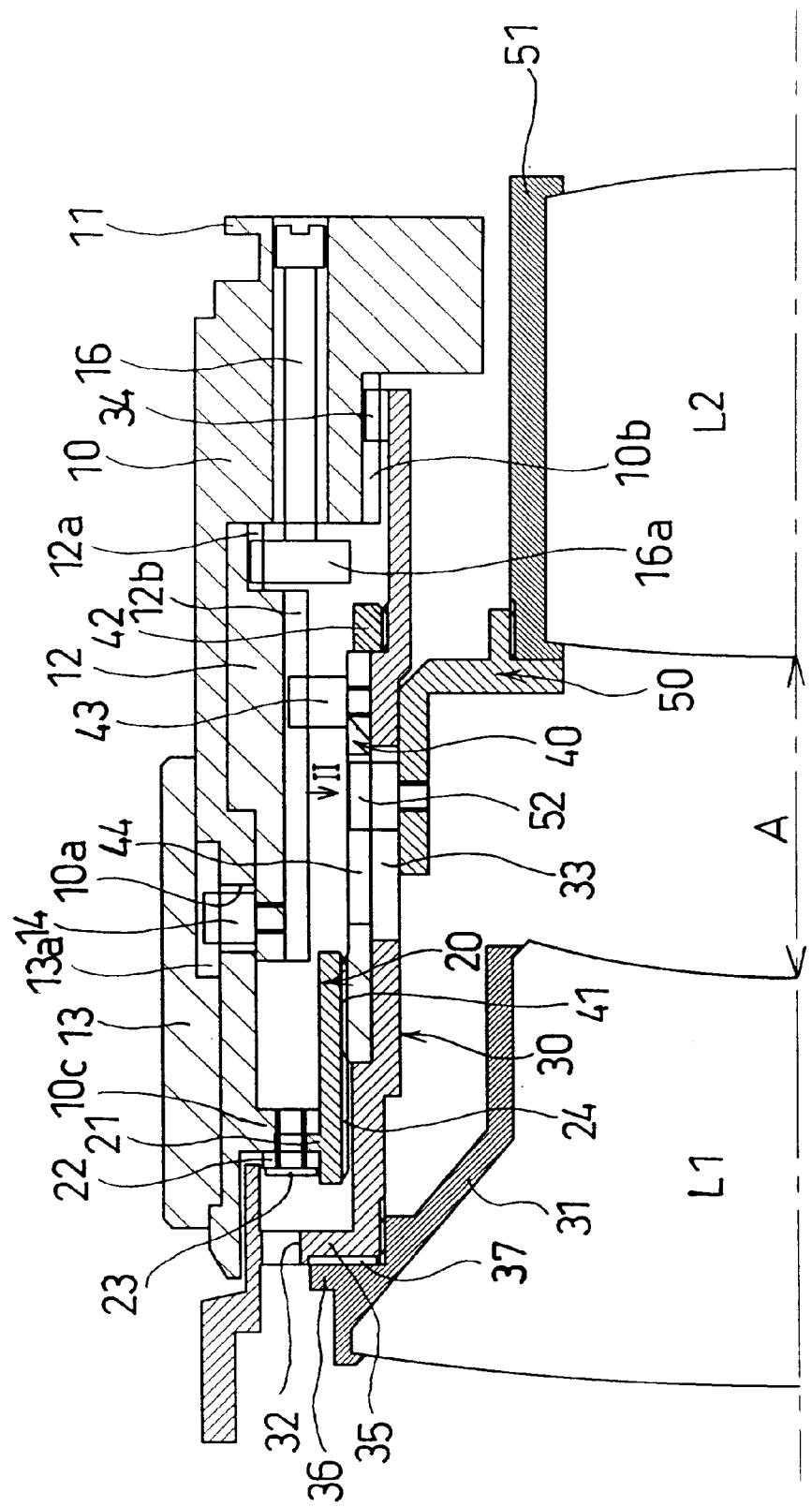
FIG. 1 is a longitudinal sectional view of the upper half of a floating lens barrel according to an embodiment of the present invention.
Figure 2:
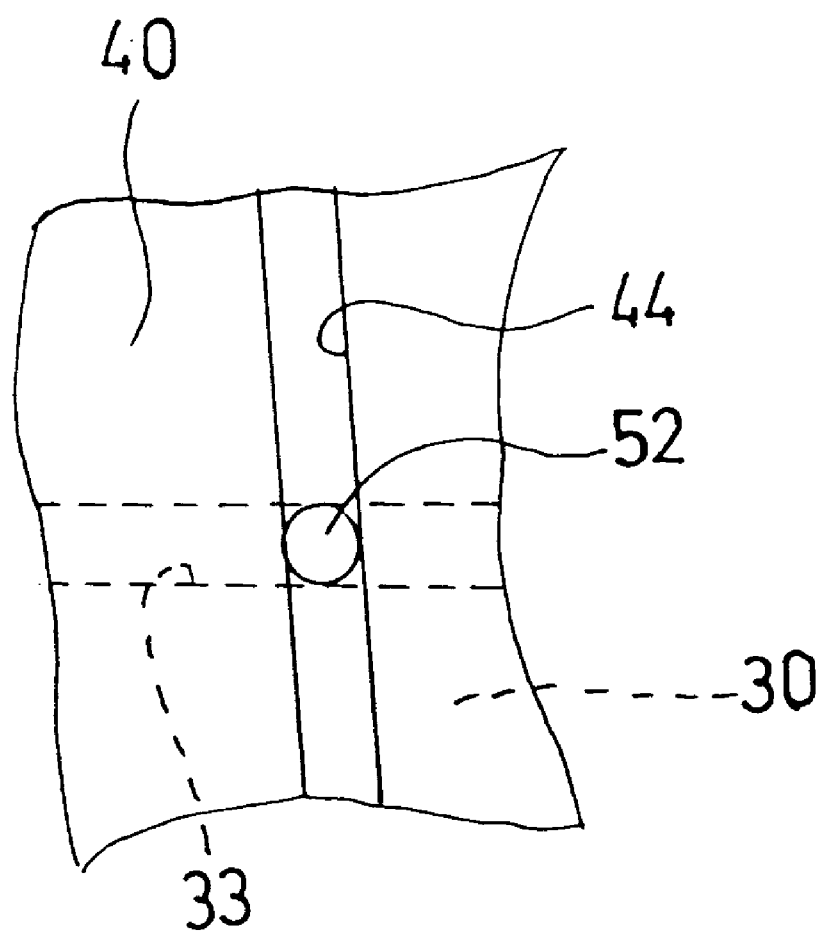
FIG. 2 is a developed view of a part of a floating lens barrel, viewed from the direction indicated by the arrow II in FIG. 1.

FIGS. 1 and 2 show a first embodiment of a floating lens barrel according to the present invention, applied to an interchangeable AF lens barrel for a single lens reflex camera. A stationary lens barrel 10 is provided on its rear end with a lens mount 11 which can be connected to a body mount of the camera body. The stationary barrel 10 rotatably supports a rotation ring 12 and a distance adjusting ring 13 on the inner peripheral surface and the outer peripheral surface thereof, respectively. The rotation ring 12 is provided with a radially extending rotation transmission pin 14 secured thereto. The pin 14 is fitted in a peripheral groove 10a extending in a circumferential direction of the stationary barrel 10 and projects through the stationary barrel 10. The outer end of the pin 14 is fitted in an association groove 13a which is formed in the distance adjusting ring 13 and which extends in parallel with the optical axis, so that the distance adjusting ring 13 always rotates together with the rotation ring 12.

An AF drive shaft 16 is rotatably supported within the stationary lens barrel 10, and extends in parallel with the optical axis. The AF drive shaft 16 is connected to and driven by an AF drive shaft (not shown) of the camera body. The AF drive shaft 16 is provided on its front end with an association gear 16a which is in mesh with a gear 12a formed on the inner peripheral surface of the rotation ring 12. Consequently, the rotation ring 12 is rotated also by the rotation of the AF drive shaft 16. The rotation ring 12 is provided on the inner peripheral surface thereof with a rotation transmission groove 12b which extends in parallel with the optical axis. The stationary barrel 10 is equipped with a linear movement guide groove 10b which extends in parallel with the optical axis and which is provided on the small diameter portion of the stationary barrel that is located in the back of the rotation ring 12. The stationary barrel 10, the lens mount 11, the rotation ring 12, the distance adjusting ring 13, the rotation transmission pin 14, the association groove 13a and the AF drive shaft 16 are elements on the common lens barrel side. The stationary lens barrel 10 is provided on the front end portion thereof with an inner flange 10c which supports a separate lens barrel having a focusing lens group composed of a front lens group L1 and a rear lens group L2.

The separate lens barrel supported by the inner flange 10c includes a female helicoid ring 20, a front lens support ring 30, a male helicoid ring 40, and a rear lens support ring 50. The focusing front lens group L1 is secured to a front lens support frame 31 which is secured to the front lens support ring 30 by screw engagement. Likewise, the focusing rear lens group L2 is secured to a rear lens support frame 51 which is secured to the rear lens support ring 50 by screw engagement. The inner flange 35 of the front lens support ring 30 is opposed to the outer flange 36 of the front lens support frame 31 to determine the axial position of the support frame 31 relative to the support ring 30.

The separate lens barrel elements mentioned above can be totally removed forward from the stationary barrel 10 when the female helicoid ring 20 is disengaged from the stationary barrel 10 (inner flange 10c). This will be discussed below in more detail.

The female helicoid ring 20 is provided with an outer flange 21 which abuts against the front surface of the inner flange 10c of the stationary barrel 10. The outer flange 21 and the inner flange 10c can be connected through a holding ring 22 and a securing screw 23. When the screw 23 is loosened, the inner and outer flanges can be relatively rotated. The front lens support ring 30 is provided with a tool insertion hole 32 in which a tool for rotating the screw 23 can be inserted.

The front lens support ring 30 located on the inner peripheral surface of the female helicoid ring 20 does not engage with the female helicoid 24 of the female helicoid ring 20. Instead, the male helicoid 41 of the male helicoid ring 40 engages with the female helicoid 24. The male helicoid ring 40 is held around the front lens support ring 30 by a retainer ring 42 which is screw-engaged with the front lens support ring 30 so that the male helicoid ring 40 rotates but not to move in the axial direction relative to the front lens support ring 30. Namely, the male helicoid ring 40 moves together with the front lens support ring 30 in the optical axis direction. The male helicoid ring 40 is equipped with a radially projecting rotation transmission pin 43 secured thereto, which is slidably inserted into the rotation transmission groove 12b of the rotation ring 12 with minimum clearance in the circumferential direction. The male helicoid ring 40 is provided on the peripheral surface thereof with a lead groove (cam groove) 44 (FIG. 2).

The front lens support ring 30 is provided with a linear movement guide groove 33 which extends in parallel with the optical axis traversing the lead groove 44. The rear lens support ring 50, which is fitted within the inner peripheral surface of the front lens support ring 30 so as to relatively move, is provided with a cam follower pin 52 secured thereto, which is fitted in the linear movement guide groove 33 and the lead groove 44. Moreover, the front lens support ring 30 is equipped on the rear end thereof with a linear movement guide pin 34 which is inserted into the linear movement guide groove 10b of the stationary ring 10.

Upon assembling the floating lens barrel according to the construction described above, the stationary lens barrel 10, the lens mount 11, the rotation ring 12, the distance adjusting ring 13, the rotation transmission pin 14 and the AF drive shaft 16 are assembled to form a sub-assembly as a common lens barrel. The female helicoid ring 20, the front lens support ring 30, the male helicoid ring 40 and the rear lens support ring 50 are assembled to form a sub-assembly as a separate lens barrel. Upon formation of the sub-assembly of the separate lens barrel, a spacer washer 37 whose thickness is selected so as to obtain a predetermined distance "A" between the focusing front and rear lens groups L1 and L2 is inserted between the inner flange 35 of the front lens support ring 30 and the outer flange 36 of the front lens support frame 31.

The separate lens barrel thus sub-assembled is inserted in the common lens barrel and thereafter, the linear movement guide pin 34 of the front lens support ring 30 is fitted in the linear movement guide groove 10b of the stationary lens barrel 10; the rotation transmission pin 43 of the male helicoid ring 40 is fitted in the rotation transmission groove 12b of the rotation ring 12; and the outer flange 21 of the female helicoid ring 20 is pressed against the inner flange 10c of the stationary lens barrel 10. In this state, the distance adjusting ring 13 is held so as not to rotate, to prevent the front lens support ring 30 and the male helicoid ring 40 from rotating through the engagement of the grooves 10b and 12b with the pins 34 and 43. Then the relative rotation of the female helicoid ring 20 and the stationary lens barrel 10 is given so that the front lens support ring 30 and the male helicoid ring 40, and accordingly the elements of the separate lens barrel (except the female helicoid ring 20) are moved in the optical axis direction as a whole. Thus, the adjustment of the flange back distance (the FB adjustment) between the rear end surface of the rear lens group L2 and the film surface without varying the distance between the focusing front lens group L1 and rear lens group L2 can be carried out. Upon completion of the FB adjustment, the screw 23 is fastened to secure the outer flange 21 between the holding ring 22 and the inner flange 10c. The assembling operation is thus completed.

In the assembled state, if the rotation ring 12 is rotated through the distance adjusting ring 13 or the AF drive shaft 16, the rotation is transmitted to the male helicoid ring 40 through the rotation transmission groove 12b and the rotation transmission pin 43. Since the male helicoid ring 40 is screw-engaged by the female helicoid 24 of the female helicoid ring 20 through the male helicoid 41, the male helicoid ring 40 is moved in the optical axis direction while rotating. Since the front lens support ring 30 (focusing front lens group L1) which is moved in the optical axis direction together with the male helicoid ring 40 is guided to linearly move through the linear movement guide pin 34 and the linear movement guide groove 10b, the linear movement of the front lens support ring 30 occurs. Namely, the focusing front lens group L1 is moved in the optical axis direction. When the male helicoid ring 40 is rotated, the axial movement of the rear lens support ring 50 (rear lens group L2) takes place due to the cam follower pin 52 which is fitted in the lead groove 44 and the linear movement guide groove 33. Namely, the focusing operation with the floating movement is carried out. In the illustrated embodiment, the lead groove 44 extends linearly, but it is possible to replace the same with a non-linear cam groove, in accordance with the requirements of the floating lens system.

In the floating mechanism mentioned above, the single helicoid connection is established only between the female helicoid ring 20 and the male helicoid ring 40. Since there are no plural helicoid connections unlike the prior art, the drive torque can be reduced. Due to the single helicoid connection, no deviation of the axes of the front and rear lens groups L1 and L2 tends to occur. Moreover, the adjustment of the distance between the front lens group L1 and the rear lens group L2 can be easily adjusted by properly selecting the thickness of the spacer washer 37. The FB adjustment can be also extremely easily carried out as mentioned above. In general, the distance between the front and rear lens groups L1 and L2 is measured for each lot, so that the same thickness of spacer washer 37 can be used for the same lot.

As can be understood from the above discussion, in the floating lens barrel according to the present invention, since the separate lens barrel of the female helicoid ring 20, the front lens support ring 30, the male helicoid ring 40 and the rear lens support ring 50 is combined with the common lens barrel of the stationary lens barrel 10, the lens mount 11, the rotation ring 12, the distance adjusting ring 13, the rotation transmission pin 14 and the AF drive shaft 16, it is possible to combine a different separate lens barrel, in which one, some or all of the female helicoid ring 20 through to the rear lens support ring 50 can be exchanged.

Figure 3:
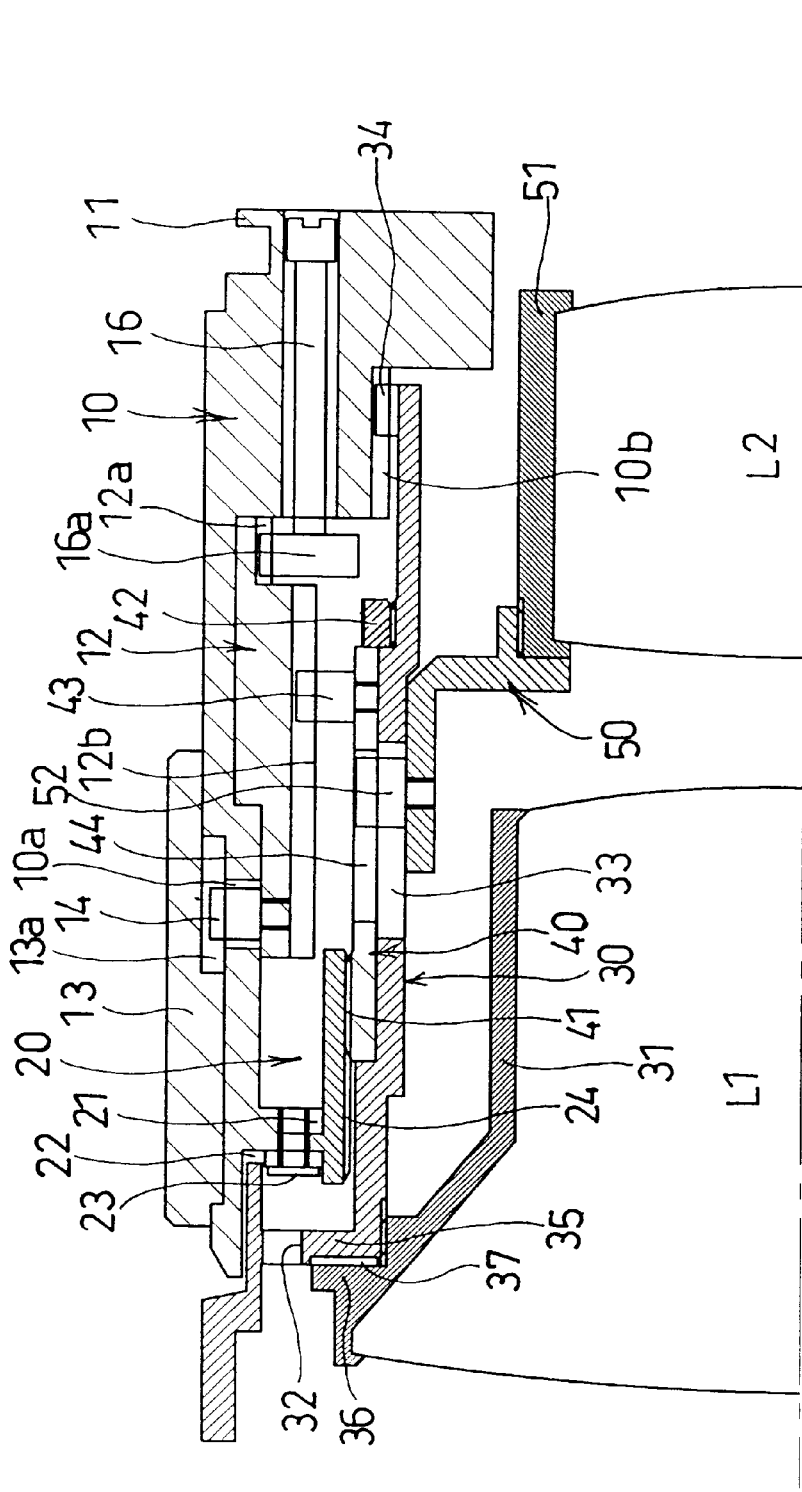
FIG. 3 is a longitudinal sectional view of an upper half of a floating lens barrel according to another embodiment of the present invention.

FIG. 3 shows a floating lens barrel in which a different separate lens barrel is combined with the common lens barrel. In this example, the distance between the front and rear lens groups L1 and L2 and the thicknesses of the lens group L1 and L2 are different from those in FIG. 1. Of course, the diameter of the ring members or the shape of the lead groove 44 can be different from those in FIG. 1 or 2, provided that the separate lens barrel is detachably mounted to the common lens barrel.

Figure 4:
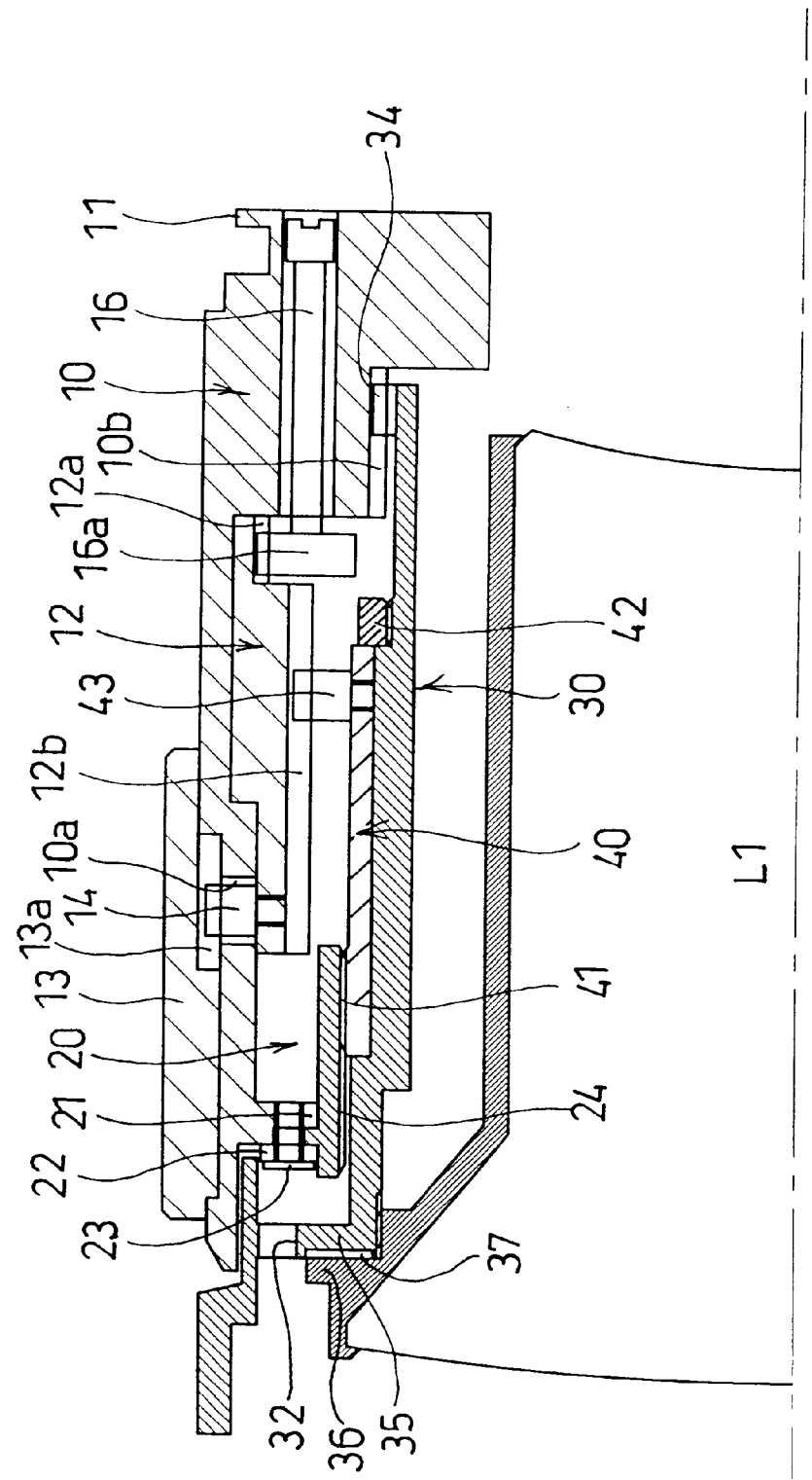
FIG. 4 is a longitudinal sectional view of an upper half of a lens barrel having no floating function, which is realized by the use of a common lens barrel of a floating lens barrel shown in FIGS. 1 and 2, according to another embodiment of the present invention.

The common lens barrel system according to the present invention can be used for the normal focusing operation (in which the whole focusing lens groups are moved together) without employing the floating mechanism. FIG. 4 shows an example thereof. In FIG. 4, the focusing lens group is composed of a single lens group L1 (i.e., there is no rear lens group L2). In comparison with the embodiments shown in FIGS. 1 through 3, in the embodiment shown in FIG. 4, there are no elements associated with the rear lens group L2. Namely, the rear lens support ring 50, the rear lens support frame 51, the cam follower pin 52, and the lead groove 44 are not provided in the arrangement illustrated in FIG. 4. The remaining structure of FIG. 4 is the same as that in FIG. 1 or 3. In the embodiment shown in FIG. 4, the same operation and effect as those of the floating lens barrel can be obtained, except in connection with the distance between the front and rear lens groups L1 and L2 or deviation of the axes of the front and rear lens groups. Of course, any separate lens barrel shown in FIG. 1, 3 or 4 can be selectively combined with a common lens barrel.

According to the present invention, a floating lens barrel or a non-floating lens barrel (in which a single helicoid connection is provided) can be obtained, whereby the drive torque can be reduced. Moreover, no deviation of the axes of the front and rear lens groups in the floating lens barrel tends to occur; the distance between the front and rear lens groups can be easily adjusted; and the FB adjustment can be easily carried out. Furthermore, according to the common lens barrel system, the stationary lens barrel can be commonly used, thus resulting in a reduction of the manufacturing cost.

What is claimed is:

1. A floating lens barrel having a focusing front lens group and a focusing rear lens group, comprising:

a stationary barrel to be connected to a camera body;

a rotation ring which is rotatable relative to said stationary barrel and which is rotated in accordance with a focusing operation;

a female helicoid ring provided on the stationary barrel;

a front lens support ring which supports said focusing front lens group and which is guided to move linearly in the optical axis direction;

a male helicoid ring which is supported by said front lens support ring so as to rotate relative thereto but not to move in the optical axis direction relative to the front lens support ring, said male helicoid ring being provided with a cam groove;

a rotation transmission mechanism for transmitting the rotation of said rotation ring to said male helicoid ring; and a rear lens support ring which holds said focusing rear lens group and which is guided to move linearly in the optical axis direction by said front lens support ring, said rear lens support ring being moved relative to the front lens support ring in the optical axis direction in accordance with said cam groove of the male helicoid ring when the male helicoid ring is rotated.

2. A floating lens barrel according to claim 1, wherein the rotation transmission mechanism is comprised of a rotation transmission groove which extends in parallel with the optical axis and which is formed on one of either said rotation ring or said male helicoid ring, and a rotation transmission pin which is provided on the other of said either said male helicoid ring or said rotation ring, said rotation transmission pin being slidably inserted into the rotation transmission groove.

3. A floating lens barrel according to claim 1, wherein said female helicoid ring is formed so as to be separate from said stationary barrel and wherein the relative angular position therebetween is adjustable.

4. A floating lens barrel according to claim 1, wherein said female helicoid ring is detachably attached to said stationary barrel, so that when said female helicoid ring is detached from said stationary barrel, said front lens support ring, said male helicoid ring, and said rear lens support ring are detached together from said stationary barrel and the rotation ring.

5. A floating lens barrel according to claim 1, wherein said rotation ring is rotated in accordance with the manual rotation of a distance adjusting ring or in accordance with driving by an AF drive shaft.

6. A floating lens barrel according to claim 1, wherein said front lens support ring is guided in a linear movement guide groove which is formed in the stationary barrel and which extends in parallel with the optical axis.

7. A floating lens barrel according to claim 1, wherein a spacer washer is provided between a flange of said front lens support ring and a flange of the front lens support frame which is supported by said front lens support ring to adjust the relative position between said front lens support ring and said front lens support frame in the optical axis direction.

8. A common lens barrel system comprising:

a common lens barrel which comprises a stationary barrel to be connected to a camera body, and a rotation ring which is rotatably supported by the stationary barrel and which is rotated in accordance with a focusing operation of the camera;

a first separate lens barrel which comprises a female helicoid ring which can be detachably attached to the stationary barrel from the front thereof, a front lens support ring which supports a focusing front lens group and which can be inserted in said stationary barrel, said front lens support ring being guided to move linearly in the optical axis direction, a male helicoid ring which is supported by the front lens support ring so as to rotate relative thereto but not to move in the optical axis direction relative to the front lens support ring, said male helicoid ring being engaged by said female helicoid ring, a rotation transmission groove provided on one of said rotation ring and said male helicoid ring and a rotation transmission pin provided on the other of the male helicoid ring and said rotation ring, said rotation transmission pin being fitted in the rotation transmission groove, and a rear lens support ring which holds a focusing rear lens group and which is guided to move linearly in the optical axis direction by said front lens support ring, said rear lens support ring being moved relative to said front lens support ring in the optical axis direction in accordance with a cam groove formed in said male helicoid ring; and a second separate lens barrel which comprises a female helicoid ring which can be detachably attached to said stationary barrel from the front thereof, a lens support ring which supports a focusing lens group and which can be inserted in the stationary barrel, said front lens support ring being guided to move linearly in the optical axis direction, a male helicoid ring which is supported by the lens support ring so as to rotate relative thereto but not to move in the optical axis direction relative to the lens support ring, said male helicoid ring being engaged by the female helicoid ring, and a rotation transmission groove provided on one of said rotation ring and said male helicoid ring and a rotation transmission pin provided on the other said male helicoid ring or said rotation ring, said rotation transmission pin being fitted in said rotation transmission groove;

wherein said first separate lens barrel and said second separate lens barrel are selectively attached to said common lens barrel.

9. A common lens barrel system according to claim 8, wherein the relative angular position of said female helicoid rings of said first and second separate lens barrels and said stationary barrel is adjustable.

* * * * *